United States Patent [19]
Birk et al.

[11] Patent Number: 5,404,297
[45] Date of Patent: Apr. 4, 1995

[54] AIRCRAFT READING LIGHT

[75] Inventors: Brian L. Birk, Huntington Beach; John Khaziran, Orange, both of Calif.

[73] Assignee: Puritan-Bennett Corporation, Overland Park, Kans.

[21] Appl. No.: 184,563

[22] Filed: Jan. 21, 1994

[51] Int. Cl.6 .............................. F21M 3/18
[52] U.S. Cl. ..................... 362/421; 362/226; 362/287; 362/364; 362/372; 362/374
[58] Field of Search ............... 362/226, 269, 274, 275, 362/285, 287, 288, 364, 365, 372, 374, 375, 419, 421

[56] References Cited

U.S. PATENT DOCUMENTS

| | | | |
|---|---|---|---|
| 1,739,641 | 12/1929 | Lessmann | 362/421 |
| 2,782,295 | 2/1957 | Schwenkler | 362/365 |
| 3,234,954 | 3/1966 | Bergman | 362/274 |
| 3,246,320 | 4/1966 | Houbolt | 362/365 |
| 3,611,360 | 10/1971 | Bailey | 362/226 |
| 4,142,227 | 2/1979 | Aikens | 362/364 |
| 4,829,410 | 5/1989 | Patel | 362/365 |
| 5,222,801 | 6/1993 | Neer | 362/287 |

Primary Examiner—Ira S. Lazarus
Assistant Examiner—Alan B. Cariaso
Attorney, Agent, or Firm—Hovey, Williams, Timmons & Collins

[57] ABSTRACT

A lighting apparatus includes a housing and a lamp support assembly that is normally retained in but removable from the housing. The lamp support assembly includes coaxial inner and outer sleeves, and a lamp socket mounted on one of the sleeves. The inner sleeve is movable relative to the outer sleeve between a braced position in which the lamp support assembly is retained in the housing, and a released position in which the lamp support assembly is released for removal from the housing. A lamp is received in the socket, and the inner sleeve is biased toward the braced position when the lamp support assembly is positioned in the housing so that the lamp support assembly is retained in the housing.

8 Claims, 2 Drawing Sheets

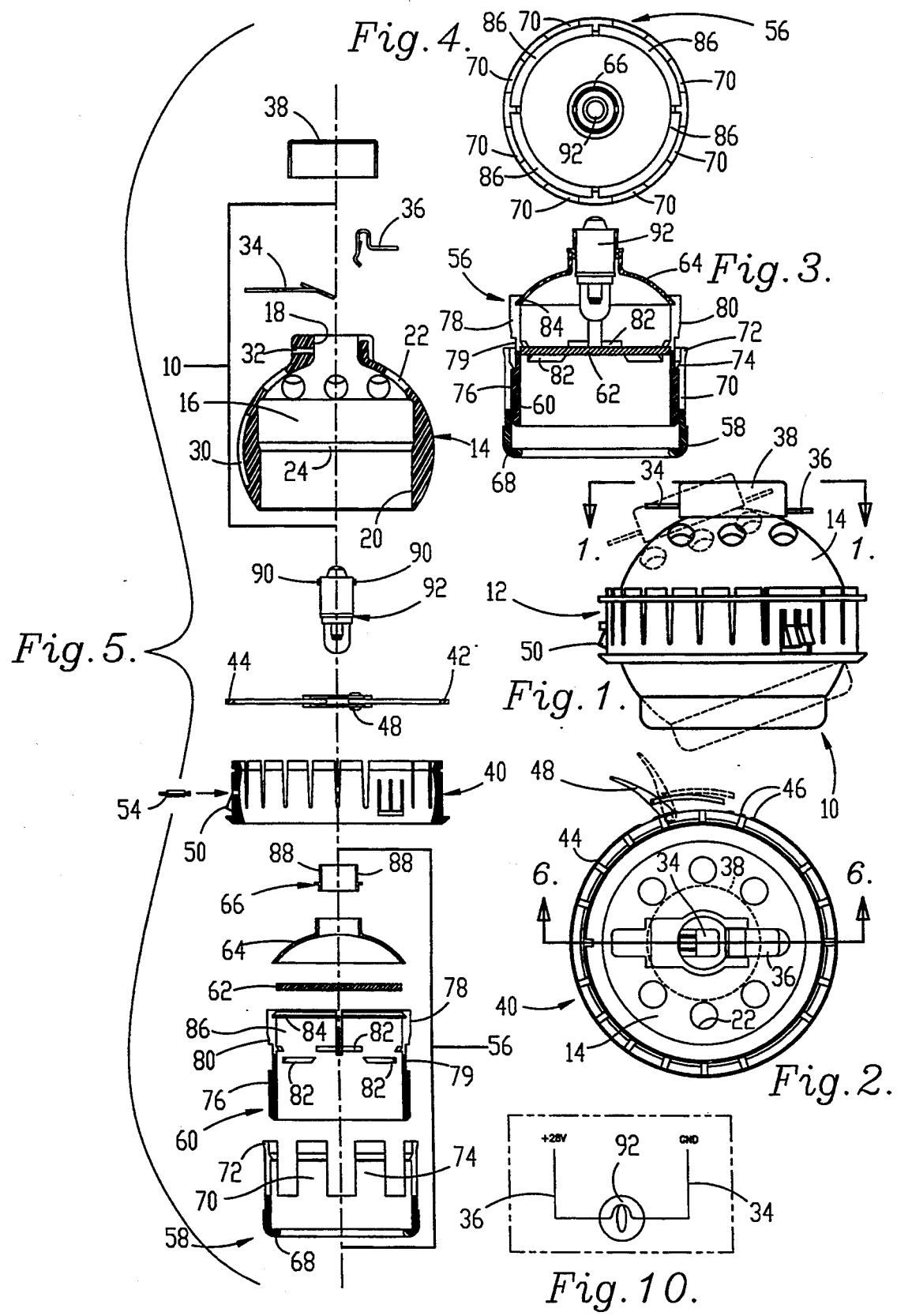

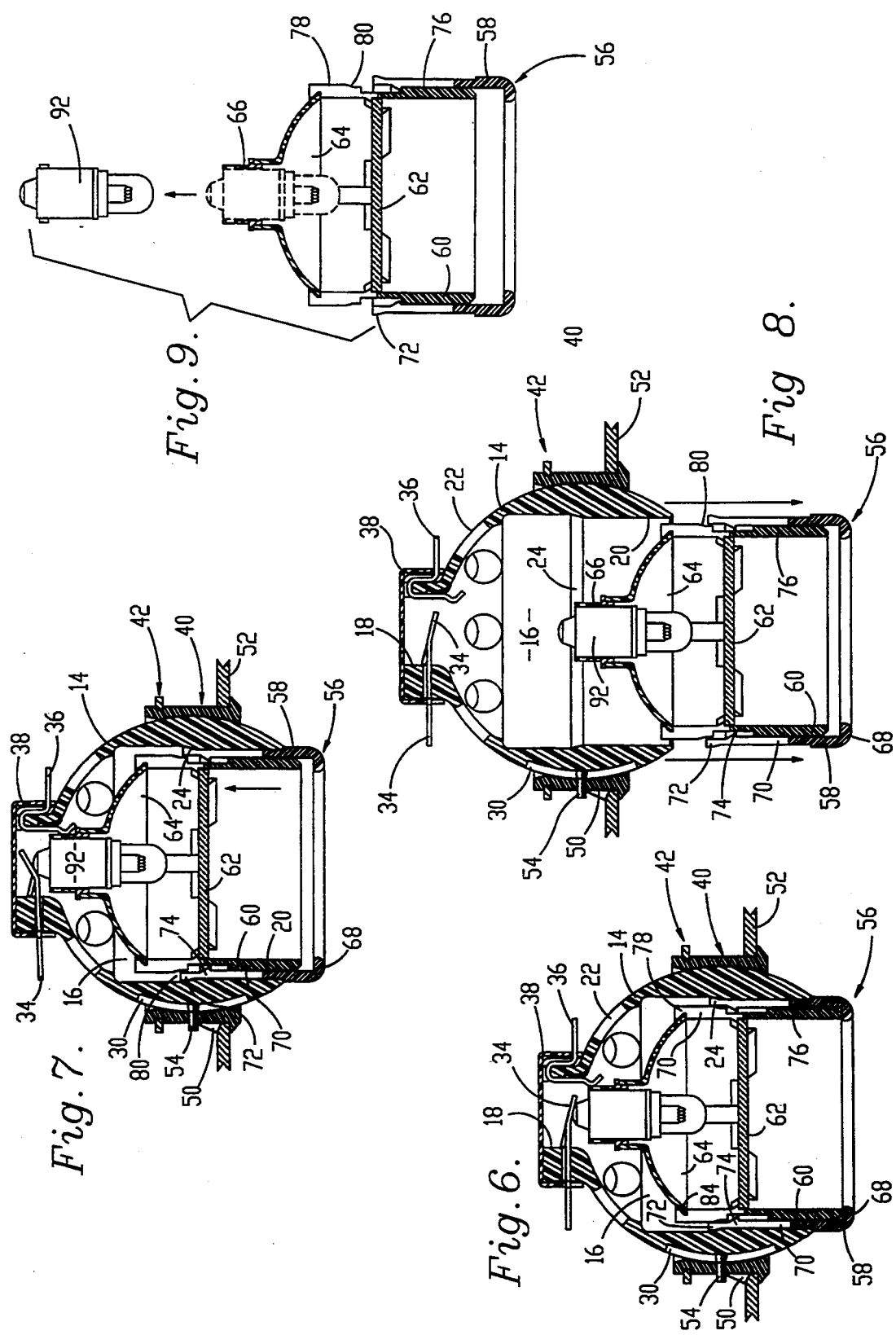

AIRCRAFT READING LIGHT

BACKGROUND OF THE INVENTION

1. Field of the Invention

The present invention relates generally to lighting devices and, more particularly, to a reading light constructed in a manner to permit easy manual replacement of burnt-out lamps while at the same time being tamper resistant.

2. Discussion of the Prior Art

It is known to provide passenger reading lights in aircraft, buses, trains and the like, which permit individual passengers to direct a reading light onto a book or other subject to be illuminated.

In conventional lighting devices of this type, it is common to permit the replacement of a burnt-out bulb by providing structure that may be withdrawn from the lamp housing, exposing the bulb for manual removal from the device. Typically, a tool is required to unfasten the removable structure from the lamp housing so that passengers will not tamper with the device. However, such constructions are also difficult for trained maintenance personnel to manipulate, and known constructions commonly require direct or close manual contact with the lamp during a replacement operation, resulting in a high risk of burns to the person carrying out replacement of a lamp.

It is also known to provide a construction including a lamp support assembly that is retained in a ball-shaped housing through the cooperation of detents on the support assembly which engage a stepped region of the housing. In this device, removal of the support assembly is carried out by manually pulling on the assembly until the force of the detents is overcome and the assembly pulls free of the housing. One problem encountered with this type of construction resides in the difficulty with which the assembly is pulled from the housing. Typically, in order to reduce tampering with the device, the detents are formed with very little flexibility so that a relatively strong force must be exerted on the assembly to pull it free from the housing, thus complicating in-travel replacement of a lamp.

OBJECTS AND SUMMARY OF THE INVENTION

It is an object of the present invention to provide a lighting apparatus which permits quick, easy replacement of a burnt-out lamp, while being resistant to tampering by passengers and others who are unaware of the method used in carrying out a replacement operation.

Another object of the invention is to provide a lighting apparatus in which a lens is recessed within the lamp housing to reduce the temperature of surfaces contacted by passengers during adjustment of the position of the lamp housing during use. In addition, the lens and lamp are both mounted on a removable lamp support assembly in such a way as to permit simplified removal of the lamp from a socket on the assembly, and protect maintenance personnel against accidental electrical shocks or burns during replacement operations.

Yet another object of the present invention is to provide a lighting apparatus that includes structure for permitting ease of assembly within an aircraft, bus, train or the like, and which permits the lamp housing to be secured in any desired use position.

In accordance with these and other objects of the invention evident from the following detailed description, a lighting apparatus constructed in accordance with the present invention includes a housing and a lamp support assembly normally retained in but removable from the housing.

The lamp support assembly includes coaxial inner and outer sleeves, and a lamp socket mounted on one of the sleeves. The inner sleeve is movable relative to the outer sleeve between a braced position in which the lamp support assembly is retained in the housing, and a released position in which the lamp support assembly is released for removal from the housing. A lamp is received in the socket.

A biasing means is provided for normally biasing the inner sleeve toward the braced position when the lamp support assembly is positioned in the housing so that the lamp support assembly is retained in the housing. The biasing means permits removal of the lamp support assembly by allowing manual movement of the inner sleeve against the biasing force to the released position.

Preferably, the outer sleeve includes a number of longitudinally extending fingers each provided with an outwardly directed detent, and the fingers are deflectable radially to permit passage of the outer sleeve through the opening when the inner sleeve is in the released position. The inner sleeve includes an outer circumferential bracing surface which abuts against the fingers of the outer sleeve when the inner sleeve is oriented in the braced position so that the fingers are prevented from deflecting radially inward and the lamp support assembly is retained in the housing. The bracing surface is movable away from the fingers when the inner sleeve is in the released position to allow deflection of the fingers so that the lamp support assembly may be moved through the opening.

By constructing a lighting apparatus in accordance with the present invention, numerous advantages are realized. For example, by providing a lamp support assembly as described, it is possible for maintenance personnel to remove the support assembly manually from the housing and replace the lamp without the need for a tool. Also, because of the method used to release the support assembly for removal from the housing, it is difficult for a person without knowledge of the method to perform the operation. Thus, the construction is tamper resistant.

Another advantage achieved through the use of the present invention resides in supporting the lamp within a socket provided on the lamp support assembly so that when the assembly is removed from the housing the lamp may be removed by simply turning the assembly upside down allowing the lamp to fall from the socket. This construction also prevents the person performing the replacement from being burned by the lamp.

Also, because the lamp is removed from the housing with the support assembly, the lamp is removed from contact with the electrical terminals within the housing, and accidental shocking of the maintenance personnel is prevented.

BRIEF DESCRIPTION OF THE DRAWING FIGURES

A preferred embodiment of the present invention is described in detail below with reference to the attached drawing figures, wherein:

FIG. 1 is a side elevational view of a lighting apparatus constructed in accordance with the preferred embodiment of the present invention;

FIG. 2 is a top plan view of the lighting apparatus;

FIG. 3 is a side sectional view of the lamp support assembly of the apparatus;

FIG. 4 is a bottom plan view of the lamp support assembly;

FIG. 5 is an exploded side sectional view of the apparatus, illustrating the various parts forming the lamp support assembly, housing and mounting assembly of the apparatus;

FIG. 6 is a side sectional view of the apparatus, taken along line 6—6 of FIG. 2, illustrating the inner sleeve of the lamp support assembly in the braced position;

FIG. 7 is a side sectional view of the apparatus, taken along line 6—6 of FIG. 2, illustrating the inner sleeve of the lamp support assembly in the released position;

FIG. 8 is a side sectional view of the apparatus, taken along line 6—6 of FIG. 2, illustrating the lamp support assembly being removed from the housing assembly;

FIG. 9 is an exploded side sectional view of the lamp support assembly, illustrating the manner in which the lamp is removed from the assembly; and FIG. 10 is a circuit diagram, illustrating the electrical circuit including the lighting apparatus.

DETAILED DESCRIPTION OF THE PREFERRED EMBODIMENT

A lighting apparatus constructed in accordance with the preferred embodiment of the present invention is illustrated in FIG. 1, and includes a housing assembly 10 that is supported for universal movement within a mounting assembly 12.

As shown in FIG. 5, the housing assembly includes a ball-shaped housing 14 formed of a thermoplastic material and having an interior space 16, a first opening 18 connecting the interior space to a region above the housing, a second opening 20 extending downward from the interior space, and a plurality of vent openings 22 connecting the interior space with the region exterior of the housing for ventilating the space. The interior circumferential surface of the housing is cylindrical and is defined by a diameter that is slightly larger than the diameter of the second opening 20. This difference between the two diameters creates a step or ramp 24 between the interior space 16 and the opening 20.

The exterior surface of the housing 14 is provided with a recessed region 30, and a radial through-hole 32 is provided in communication with the first opening 18. A first electrical terminal 34 is received within the through-hole, and a second electrical terminal 36 is secured to the edge of the first opening 18 and extends into the opening a predetermined distance beyond the first terminal 34. The terminals 34, 36 are formed of beryllium copper and snap onto the housing 14. The electrical circuit including the apparatus is illustrated in FIG. 10, and simply includes a first conductor connected between the terminal 36 and a power source, and a second conductor connected between the terminal 34 and ground.

Returning to FIG. 5, a neoprene rubber terminal guard 38 is sized for receipt over the upper end of the housing and protects the terminals against physical contact with objects outside the apparatus.

The mounting assembly includes an annular flange 40 formed of thermoplastic material and having an inner circumferential surface shaped to receive the outer circumferential surface of the housing 14. The flange 40 is formed of a plurality of connected, longitudinally extending fingers, and a locking ring assembly 42 is provided which encircles the flange across the tips of the fingers, and holds the fingers against the outer circumferential surface of the housing.

As shown in FIG. 2, the locking ring assembly 42 includes a stainless steel split ring 44 having two slots 46 provided on one end thereof and a clasp 48 on the other end. The clasp 48 may be fastened in one of the slots 46 to secure the housing within the flange. When the clasp is connected to the nearest slot a minimal amount of compression force is asserted on the housing so that the housing is universally movable within the flange. Thus, the position of the apparatus may be adjusted by a passenger, but enough force is exerted on the housing to prevent the housing from vibrating out of position. When the clasp is connected to the farthest slot the compression force exerted on the housing is sufficient to lock the apparatus at a specific position.

The flange 40 includes a number of flexible feet 50 extending radially outward from the bases of some of the fingers. These flexible feet hold the flange on a support panel 52, as shown in FIG. 6, and may be deflected in a radial direction during assembly on the panel to lock the flange in position. A pin 54 extends into the flange and is received within the recessed region 30 on the outer surface of the housing 14. The pin 54 prevents the housing from being moved beyond predetermined limits in order to protect against the possibility that the electrical wires to the apparatus will become tangled during movement of the housing.

A lamp support assembly 56 is normally received within the housing. As shown in FIG. 3, the assembly 56 includes an outer sleeve 58, an inner sleeve 60, a lens 62, a reflector 64, and a socket 66. The outer sleeve 58 is formed of thermoplastic material and is annular in shape. The outer sleeve includes a radially inwardly directed flange 68 at the lower end thereof against which the inner sleeve 60 abuts during normal use. A number of longitudinally extending fingers 70 are provided on the outer sleeve. The inner diameter of the outer sleeve is slightly greater at the free end of the fingers than it is along the remainder of the sleeve, and each finger includes an outwardly directed detent 72 at the free end thereof as well as an inwardly directed barb 74. The barb separates the remainder of the sleeve from the region of increased diameter.

The inner sleeve 60 is also formed of thermoplastic material and is of annular shape, being of a size adapted to fit within and be coaxial with the outer sleeve. The inner sleeve 60 includes an outer circumferential surface provided with a small diameter region 76 and a large diameter region 78. An annular groove 79 is formed in the outer circumferential surface between the small diameter and large diameter regions, and a small, stepped sloping region 80 extends between the annular groove and the large diameter region. This stepped region defines a bracing surface which abuts the inner circumferential surface of the free ends of the fingers 70 of the outer sleeve 58 when the inner sleeve 60 is received in the outer sleeve and moved against the flange 68, as shown in FIG. 6.

Turning to FIG. 5, the inner sleeve 60 includes an inner circumferential surface provided with two longitudinally spaced rows of inwardly directed projections 82 adapted to receive and hold the lens within the inner sleeve. The rows of projections 82 are positioned well within the inner sleeve in order to protect the passenger from inadvertently contacting the lens. Preferably, the projections are located closer to the upper end of the inner sleeve than to the lower end to protect the lens from contact during adjustment of the position of the housing.

The upper end of the inner sleeve defining the large diameter region 78 includes four longitudinally extending arms 86 which permit some flexibility of the bracing surfaces. However, as shown in FIG. 4, each arm radially supports two of the fingers 70 of the outer sleeve 58 and prevents the fingers from being deflected radially inward when the inner sleeve is positioned against the flange 68, as shown in FIG. 6. The inner circumferential surface of the inner sleeve includes an annular groove 84 within which the reflector 64 is received and held. This groove 84 is formed at the free ends of the arms 86.

Returning to FIG. 3, the lens 62 is formed of any conventional transparent or semi-transparent material and may be of any desired shape in order to form and direct light from the lamp in a predetermined manner. The lens 62 includes an outer circumferential edge sized for receipt between the longitudinally spaced rows of projections so that the lens may be snap-fit between the projections and retained on the inner sleeve. Because the lens is recessed within the assembly, it is rendered less accessible to passengers, thus reducing the amount of cleaning that is necessary and protecting against lens scratching or breakage.

The reflector 64 is formed of thermoplastic material and is sized for snap-fit receipt within the annular groove 84. The socket 66 is formed of cadmium plated brass and is received in the distal end of the reflector. As shown in FIG. 5, the socket includes a pair of slots 88 adapted to receive two pins 90 provided on the lamp 92. The lamp is preferably a halogen lamp, and is supported in the socket 66 with one contact extending beyond the distal end of the socket and the pins 90 extending through the slots 88. The lighting element of the lamp 92 is disposed within the inner sleeve between the reflector 64 and the lens 62.

By providing a snap-fit connection between the various components of the apparatus, secondary attachment operations such as bonding, riveting, or ultrasonic welding are obviated.

During normal use of the lighting apparatus, as shown in FIG. 6, the lamp support assembly 56 is positioned within the housing, and is retained in position by the detents 72 on the fingers 70 of the outer sleeve, which engage the step or ramp 24 defined within the housing. The terminal 34 biases the inner sleeve 60 against the flange 68 of the outer sleeve 58, and the stepped and large diameter regions 78, 80 of the inner sleeve abut against and brace the fingers against inward radial movement.

In order to replace the lamp 92, as shown in FIG. 7, the inner sleeve 60 is manually forced longitudinally into the housing 14 against the biasing force exerted by the terminal 34 which is deflected away from the lamp during this upward movement of the inner sleeve, and the terminal 36 slides along the outer surface of the socket. This upward movement of the inner sleeve 60 removes the bracing surface of the stepped sloping region 80 from contact with the fingers 70 of the outer sleeve, and provides enough clearance between the fingers and the inner sleeve to permit radially inward deflection of the fingers sufficient to enable the detents 72 to ride over the step or ramp 24 and out of the opening 20 of the housing 14.

Preferably, the outer sleeve 58 is constructed to permit deflection of the detents 72 upon the exertion of a force of two pounds or less so that once the inner sleeve is moved from the braced position, shown in FIG. 6, to the released position, shown in FIG. 7, removal of the assembly 56 requires very little force. As the outer sleeve 58 is pulled from the housing, the barbs 74 engage a side of the annular groove 79 in the inner sleeve so that the inner sleeve is pulled from the housing with the outer sleeve, as shown in FIG. 8.

Thereafter, as shown in FIG. 9, the lamp 92 is removed from the socket simply by turning the lamp support assembly 56 upside down and allowing the lamp to fall from the socket 66.

Although the invention has been described with reference to the preferred embodiment illustrated in the attached drawing figures, it is understood that substitutions may be made and equivalents employed herein without departing from the scope of the invention as set forth in the claims.

What is claimed is:

1. A lighting apparatus comprising:
   a housing;
   a lamp support assembly normally retained in the housing but being removable from the housing, the lamp support assembly including coaxial inner and outer sleeves, and a lamp socket mounted on one of the sleeves, the inner sleeve being movable relative to the outer sleeve between a braced position in which the lamp support assembly is retained in the housing, and a released position in which the lamp support assembly is released for removal from the housing;
   a lamp received in the socket; and
   means for normally biasing the inner sleeve toward the braced position when the lamp support assembly is positioned in the housing so that the lamp support assembly is retained in the housing, the biasing means permitting removal of the lamp support assembly by allowing manual movement of the inner sleeve against the biasing force to the released position
   wherein the housing includes an interior space and an opening exposing the interior space to exterior of the housing, the opening being formed of a diameter smaller than the diameter of the interior space in order to define a ramp in the inner circumferential surface of the housing, the lamp support assembly engaging the inner circumferential surface of the housing within the interior space and being braced against movement beyond the ramp when the inner sleeve is in the braced position.

2. A lighting apparatus as recited in claim 1, wherein the outer sleeve includes a number of longitudinally extending fingers each provided with an outwardly directed detent, the outer sleeve being formed of a diameter smaller than the diameter of the opening except for the detents which extend radially beyond the diameter of the outer sleeve, the fingers being deflectable radially to permit passage of the outer sleeve through the opening when the inner sleeve is in the released position.

3. A lighting apparatus as recited in claim 1, wherein the inner sleeve includes an outer circumferential bracing surface which abuts against the fingers of the outer sleeve when the inner sleeve is oriented in the braced position so that the fingers are prevented from deflecting radially inward and the lamp support assembly is retained in the housing, the bracing surface being movable away from the fingers when the inner sleeve is in the released position to allow deflection of the fingers so that the lamp support assembly may be moved through the opening.

4. A lighting apparatus as recited in claim 1, wherein the socket is mounted on the inner sleeve.

5. A lighting apparatus as recited in claim 1, wherein the lamp support assembly also includes a reflector and a lens, both mounted on the inner sleeve.

6. A lighting apparatus as recited in claim 1, further comprising means for mounting the housing for movement between any of a plurality of different use positions, the mounting means including a flange supported on the housing and tensioning means for adjusting the tension exerted by the flange on the housing in order to secure the housing in one of the different use positions.

7. A lighting apparatus comprising:
a housing;
a lamp support assembly normally retained in the housing but being removable from the housing, the lamp support assembly including coaxial inner and outer sleeves, and a lamp socket mounted on said inner sleeve, the inner sleeve being movable relative to the outer sleeve between a braced position in which the lamp support assembly is retained in the housing and a released position in which the lamp support assembly is released for removal from the housing, the lamp support assembly also including a reflector and a lens, both mounted on the inner sleeve;
a lamp received in the socket; and
means for normally biasing the inner sleeve toward the braced position when the lamp support assembly is positioned in the housing so that the lamp support assembly is retained in the housing, the biasing means permitting removal of the lamp support assembly by allowing manual movement of the inner sleeve against the biasing force to the released position.

8. A lighting apparatus comprising:
a housing;
an elongated lamp support assembly normally retained in the housing but being removable from the housing, the lamp support assembly including coaxial inner and outer sleeves, and a lamp socket adapted to receive a lamp and mounted on one of the sleeves adjacent one end of said assembly,
there being structure operably coupling said inner and outer sleeves for permitting selective axial movement of said inner sleeve relative to said outer sleeve between a braced position relatively remote from said one end and a release position wherein the inner sleeve is closer to said one end than in said braced position thereof;
selectively releasable locking structure operably coupled with said lamp support assembly for locking the lamp support assembly within said housing when said inner sleeve is in said braced position thereof, and for releasing the assembly and permitting removal thereof from the housing when said inner sleeve is in said release position thereof,
whereby said lamp support assembly is removable from said housing by shifting of said inner sleeve from said braced position thereof toward said one end and into said release position of the inner sleeve.

* * * * *